United States Patent
Chen (10) Patent No.: US 12,461,759 B2
(45) Date of Patent: Nov. 4, 2025

(54) DISPLAYING METHOD FOR KEY INFORMATION INTERFACE, ESTABLISHING METHOD FOR KEY INFORMATION INFERENCE MODEL, AND ELECTRONIC DEVICE USING THE SAME

(71) Applicant: Acer Incorporated, New Taipei (TW)

(72) Inventor: Kuan-Ju Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 189 days.

(21) Appl. No.: 18/367,857

(22) Filed: Sep. 13, 2023

(65) Prior Publication Data
US 2024/0403073 A1    Dec. 5, 2024

(30) Foreign Application Priority Data

May 31, 2023    (TW) .................................. 112120312

(51) Int. Cl.
G06F 9/451    (2018.01)
G06F 3/0489    (2022.01)

(52) U.S. Cl.
CPC ............ *G06F 9/451* (2018.02); *G06F 3/0489* (2013.01)

(58) Field of Classification Search
CPC ......... G06F 9/451; G06F 3/0489; G06F 3/048
See application file for complete search history.

(56) References Cited

U.S. PATENT DOCUMENTS

| | | | |
|---|---|---|---|
| 2020/0090039 A1* | 3/2020 | Song | G06V 10/82 |
| 2021/0173549 A1 | 6/2021 | Song | |
| 2021/0200326 A1* | 7/2021 | Huang | A63F 13/22 |
| 2022/0253089 A1* | 8/2022 | Lei | G06F 3/0489 |

FOREIGN PATENT DOCUMENTS

| | | | |
|---|---|---|---|
| TW | 200917091 A | 4/2009 | |
| TW | 201019183 A | 5/2010 | |
| TW | 201220173 A1 | 5/2012 | |
| TW | 202127188 A | 7/2021 | |

* cited by examiner

*Primary Examiner* — Jeanette J Parker
(74) *Attorney, Agent, or Firm* — Birch, Stewart, Kolasch & Birch, LLP (57) ABSTRACT

A displaying method for a key information interface, an establishing method for a key information inference model and an electronic device using the same are provided. The electronic device includes an application layer operation unit, a data analysis unit, an artificial intelligence operation unit and a hardware layer monitoring unit. If a hot key is triggered, the application layer operation unit detects a focused window. The data analysis unit is used to obtain at least one window frame of the focused window and obtain a plurality of pixel data according to the window frame. The artificial intelligence operation unit uses a key information inference model to infer at least one key information category and at least one key information item of a key information interface according to the pixel data. The hardware layer monitoring unit is used to retrieve an information content corresponding to the key information item.

15 Claims, 7 Drawing Sheets

DISPLAYING METHOD FOR KEY INFORMATION INTERFACE, ESTABLISHING METHOD FOR KEY INFORMATION INFERENCE MODEL, AND ELECTRONIC DEVICE USING THE SAME

This application claims the benefit of Taiwan application Serial No. 112120312, filed May 31, 2023, the subject matter of which is incorporated herein by reference.

BACKGROUND OF THE INVENTION

Field of the Invention

The invention relates in general to a displaying method for an inference, an establishing method for an inference model and an electronic device using the same, and more particularly to a displaying method for a key information interface, an establishing method for a key information inference model and an electronic device using the same.

Description of the Related Art

Along with the booming of technology, many electronic devices can execute different applications or games at the same time. When a user is executing different applications or playing different games, the user may need to obtain some key information of the electronic device, such as hardware load, Wi-Fi status, or screen brightness. To avoid the user's operation being interrupted, the industries are devoted to provide a displaying method for key information.

Besides, when the user is executing different applications or playing different games, the required key information may vary. Therefore, it has become a big challenge for the industries to adaptively display the required key information for different applications and games.

SUMMARY OF THE INVENTION

The present disclosure relates to a displaying method for a key information interface, a training and optimization method for a key information inference model and an electronic device using the same capable of establishing a key information inference model using an artificial intelligence technology, so that the key information category and the key information item that the key information interface needs to display can be directly inferred according to the pixel data of the window frame. Despite new electronic devices, new games, new streaming media applications or new utility programs are provided one after another, the key information that the key information interface needs to display can be inferred according to the pixel data by using the artificial intelligence technology of the present embodiment.

According to one embodiment of the present invention, a displaying method for a key information interface is provided. The displaying method for a key information interface includes the following steps. Whether a hot key is triggered is determined. If the hot key is triggered, a focused window is detected. At least one window frame is obtained according to the focused window. A plurality of pixel data are obtained according to the window frame. A key information inference model is used to infer at least one key information category and at least one key information item of each of the at least one key information category according to the plurality of pixel data. An information content corresponding to each of the at least one key information item is retrieved. The at least one key information category, the at least one key information item and the at least one information content are displayed on the key information interface.

According to another embodiment of the present invention, an establishing method for a key information inference model is provided. The training and optimization method of the key information inference model includes the following steps. According to a plurality of applications, a plurality of pixel data of at least one window frame of each of the applications are obtained. At least one key information category and at least one key information item of each of the at least one key information category that a key information interface needs to display when each of the applications operates are obtained according to the applications. The key information inference model is trained using the corresponding pixel data, the key information categories and the key information items.

According to an alternate embodiment of the present invention, an electronic device is provided. The electronic device includes an application layer operation unit, a data analysis unit, an artificial intelligence operation unit and a hardware layer monitoring unit. The application layer operation unit detects whether a hot key is triggered. If the hot key is triggered, the application layer operation unit detects a focused window. The data analysis unit obtains at least one window frame of the focused window and obtains a plurality of pixel data according to the window frame. The artificial intelligence operation unit uses a key information inference model to infer at least one key information category and at least one key information item of each of the at least one key information category of a key information interface according to the plurality of pixel data. The hardware layer monitoring unit retrieves an information content corresponding to each of the at least one key information item. The application layer operation unit displays the at least one key information category, the at least one key information item and the at least one information content on the key information interface.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
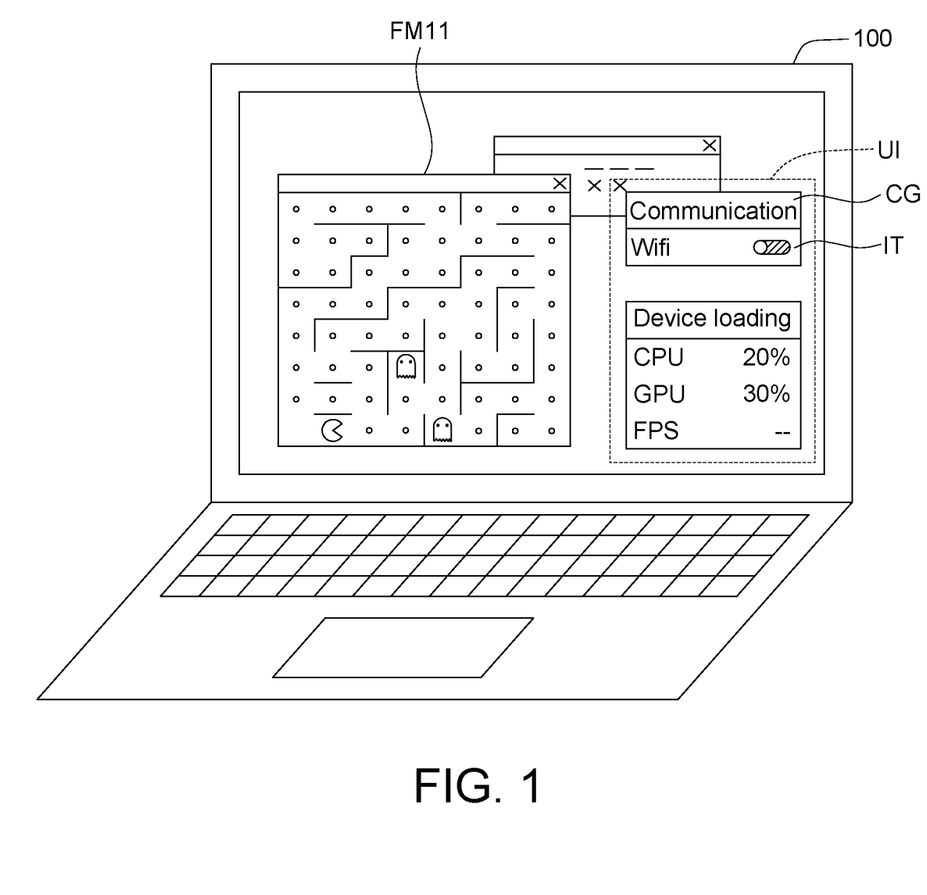
FIG. 1 is a schematic diagram of a key information interface of an electronic device being used for game according to an embodiment.

Referring to FIG. 1, a schematic diagram of a key information interface IU of an electronic device 100 being used for game according to an embodiment is shown. The electronic device 100 can be realized by such as a laptop. When a user plays games with an electronic device 100, the user can open a key information interface UI to display key information. Since the key information interface UI is displayed on the topmost layer of the screen and covers all elements displayed on the frame, it is also referred as overlay UI. As indicated in FIG. 1, the key information category CG displayed on the key information interface UI is such as "Communication" or "Device loading". The key information item IT of the key information category CG being "Communication" is such as "WiFi ON". The key information item IT of the key information category CG being "Device loading" is such as "CPU 20%", "GPU 30%", or "FPS--".

Figure 2:
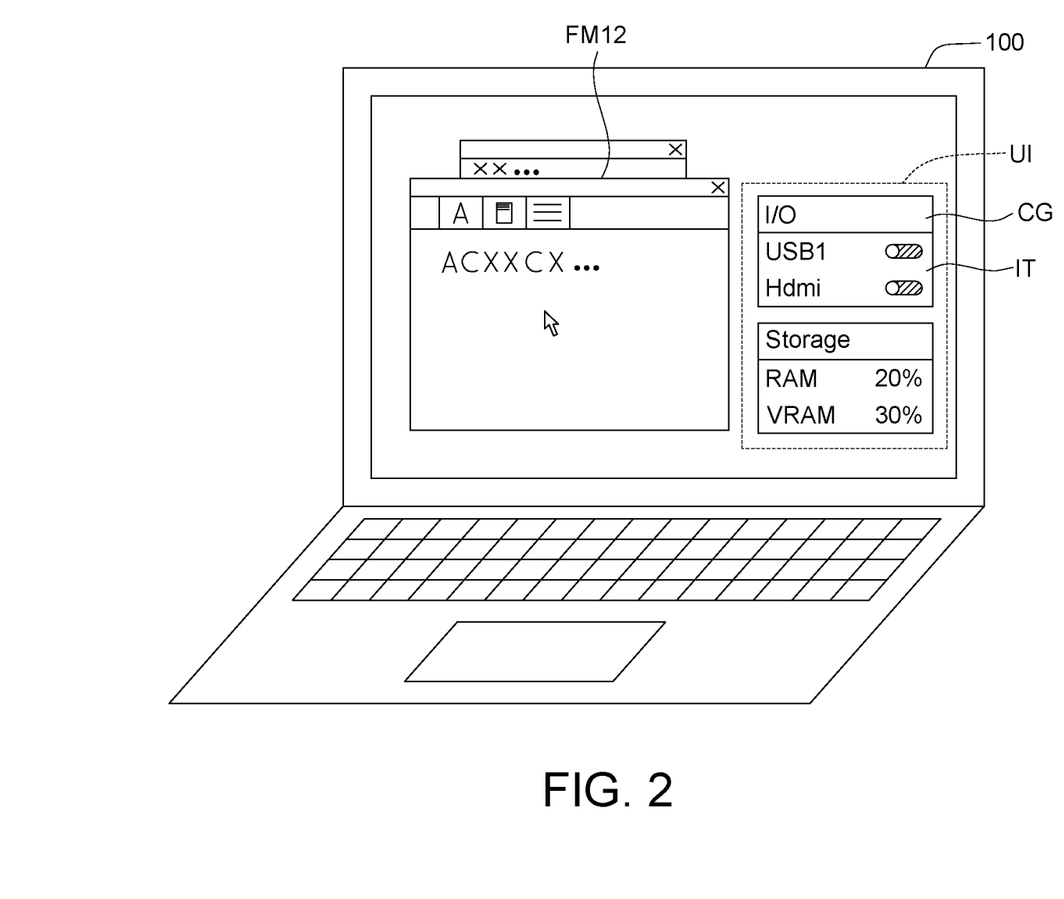
FIG. 2 is a schematic diagram of a key information interface of an electronic device being used for word processing according to another embodiment.

Referring to FIG. 2, a schematic diagram of a key information interface IU of an electronic device 100 being used for word processing according to another embodiment is shown. When the user is performing word processing with the electronic device 100, the user can open a key information interface UI to display key information. As indicated in FIG. 2, the key information category CG displayed on the key information interface UI is such as "I/O" or "Storage". The key information item IT displayed in the key information category CG being "I/O" is such as "USB1 ON" or "hdmi ON". The key information item IT displayed in the key information category CG being "Storage" is such as "RAM 20%" or "VRAM 30%".

That is, when the user executes different applications, the key information interface UI can adaptively display the required key information category CG and key information item IT.

Figure 3:
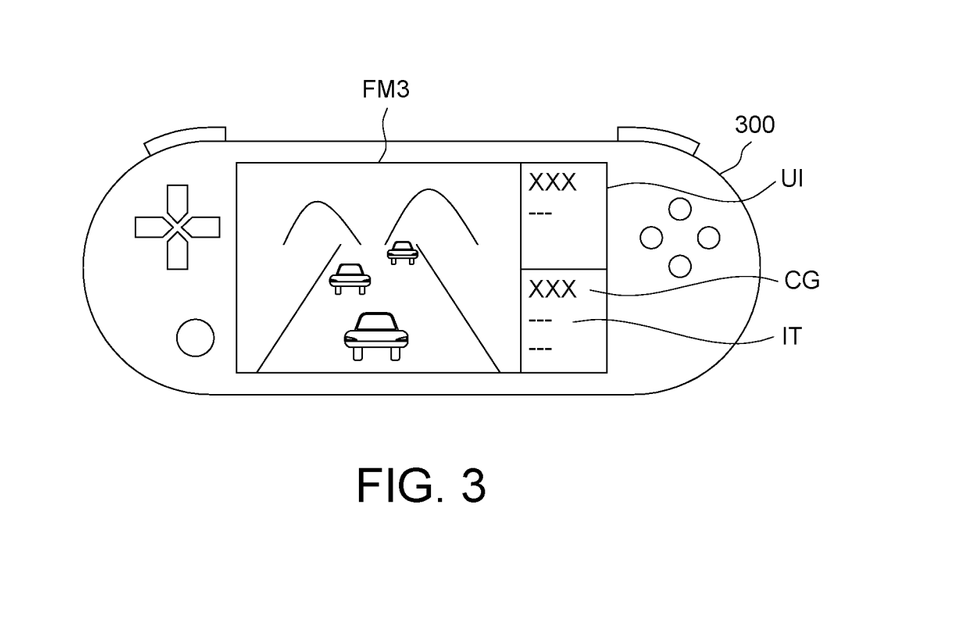
FIG. 3 is a schematic diagram of a key information interface of an electronic device being used for game according to another embodiment.

Referring to FIG. 3, a schematic diagram of a key information interface IU of an electronic device 300 being used for game according to another embodiment is shown. The electronic device 300 can be realized by a handheld game console. When a user is playing game with the electronic device 300, the user can open a key information interface UI to display key information. The key information interface UI is displayed on the topmost layer of the screen and covers all elements displayed on the frame.

Figure 4:
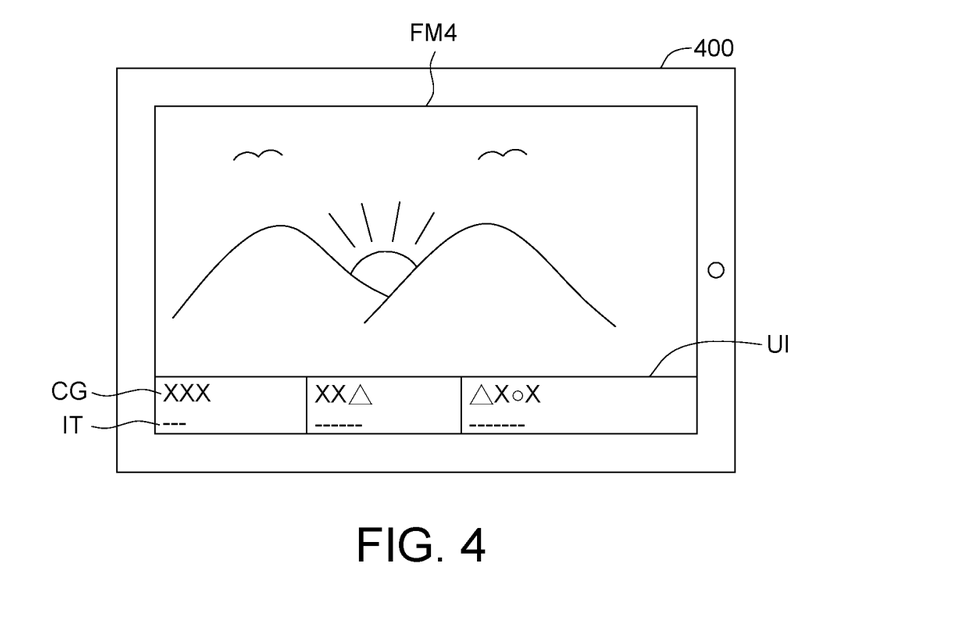
FIG. 4 is a schematic diagram of a key information interface of an electronic device being used for being used for viewing film according to another embodiment.

Referring to FIG. 4, a schematic diagram of a key information interface IU of an electronic device 400 being used for being used for viewing film according to another embodiment is shown. The electronic device 400 can be realized by a tablet. When the user is watching film with the electronic device 400, the user can open a key information interface UI to display key information. The key information interface UI is displayed on the topmost layer of the screen and covers all elements displayed on the frame.

The present disclosure does not restrict the types of the said electronic device, and can be used in such as laptops (such as the laptop for document processing, business, gaming, or special purpose), desktops, handheld game consoles, tablets and/or consumer electronics with computing and interactive functions (such as consumer electronics with display function and/or adaptive feedback interaction signals). Also, under circumstances where new electronic devices and applications are provided one after another and file names are updated, it is difficult to use applications to directly set the key information category CG and the key information item IT that the key information interface UI needs to display.

As indicated in FIG. 1, FIG. 3 and FIG. 4, the window frames FM11, FM3, FM4 for game or film have obvious pixel changes. As indicated in FIG. 2, the window frame FM12 for word processing has less obvious pixel changes. According to the state of pixel changes, the type of application being executed by the electronic devices 100, 300, and 400 can be inferred.

Figure 5:
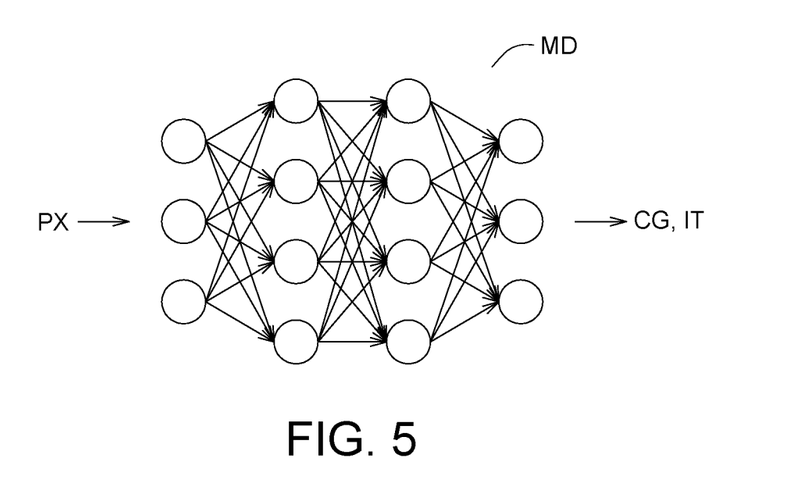
FIG. 5 is a schematic diagram of a key information inference model according to an embodiment.

Referring to FIG. 5, a schematic diagram of a key information inference model MD according to an embodiment is shown. In the present embodiment, after the key information inference model MD is established, the key information category CG and the key information item IT of the key information category CG that the key information interface UI needs to display can be directly inferred according to the pixel data PX of the window frames FM11, FM12, FM3, and FM4. That is, even when new electronic devices, games, streaming media applications or utility programs are provided, the key information category CG and the key information item IT that the key information interface UI needs to display can be directly inferred according to the pixel data PX by using the artificial intelligence technology of the present embodiment.

Figure 6:
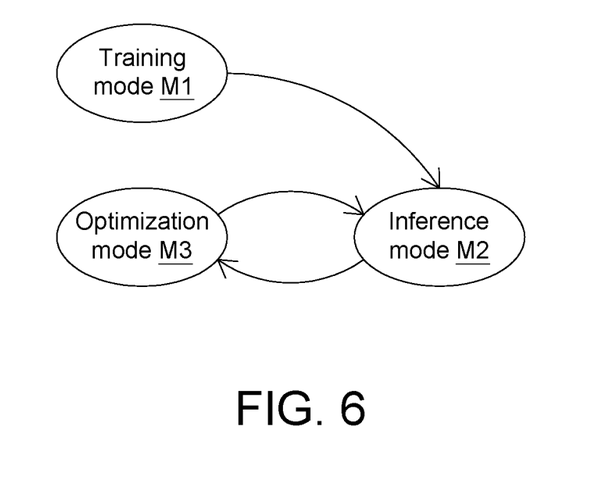
FIG. 6 is a schematic diagram of the states of a key information inference model according to an embodiment.

Referring to FIG. 6, a schematic diagram of the states of a key information inference model MD according to an embodiment is shown. In the training mode M1, once the training of the key information inference model MD finishes, the model can proceed to the inference mode M2. In the inference mode M2, the inference operation of the key information inference model MD can be performed. During the operation of the inference mode M2, if the user makes corrections to the inference result of the key information inference model MD, the model proceeds to the optimization mode M3. In the optimization mode M3, the key information inference model MD can be optimized according to the corrections made by the user.

Figure 7:
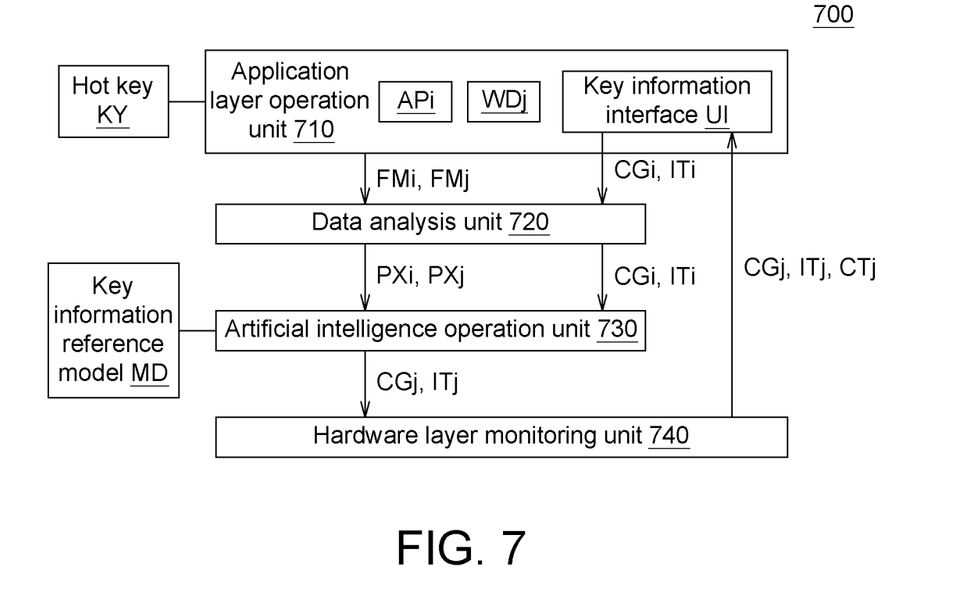
FIG. 7 is a block diagram of an electronic device according to an embodiment.

Referring to FIG. 7, a block diagram of an electronic device 700 according to an embodiment is shown. The electronic device 700 includes an application layer operation unit 710, a data analysis unit 720, an artificial intelligence operation unit 730 and a hardware layer monitoring unit 740. The application layer operation unit 710 operates various applications and detects their operations. The data analysis unit 720 obtains data from various applications, creates packets and performs analysis. The artificial intelligence operation unit 730 is used to train, operate or optimize the said key information inference model MD. The hardware layer monitoring unit 740 is used to monitor the information of each hardware element. The application layer operation unit 710, the data analysis unit 720, the artificial intelligence operation unit 730 and/or the hardware layer monitoring unit 740 can be realized by such as a circuit, a chip, a circuit board or storage device for storing program code.

Figure 8:
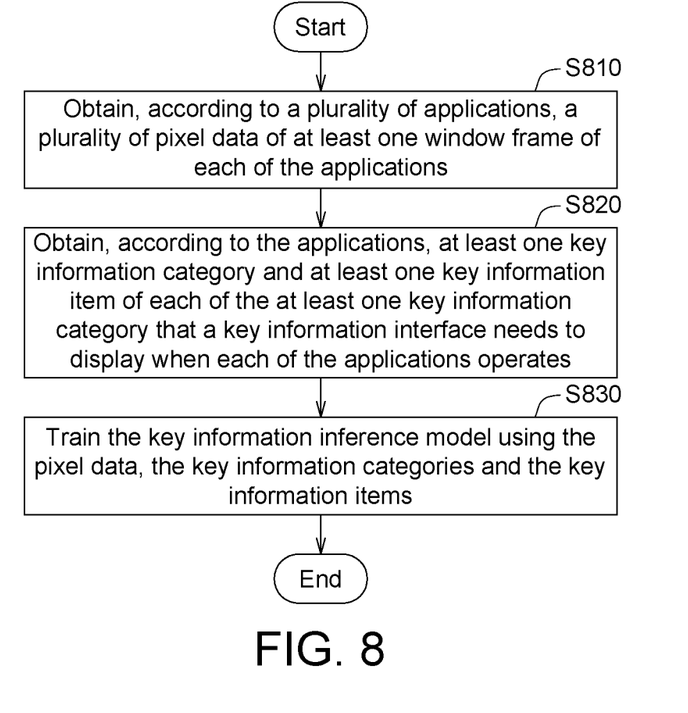
FIG. 8 is a flowchart of a training method of a key information inference model according to an embodiment.

The operations of the said training mode M1, inference mode M2 and optimization mode M3 are executed by the electronic device 700 of FIG. 7 for the purpose of exemplification. Refer to FIG. 7 and FIG. 8. FIG. 8 is a flowchart of a training method of a key information inference model MD according to an embodiment. The training method of the key information inference model MD has three steps. In steps S810 to S820, a training data set is obtained; in step S830, the model is trained according to the obtained data set.

In step S810, a plurality of pixel data PXi of at least one window frame FMi of each application APi are obtained by the data analysis unit 720 according to a plurality of applications APi. Exemplarily, the pixel data PXi includes a red pixel value, a green pixel value, a blue pixel value and an alpha value. In the present step, the pixel data PXi can be recorded as a packet according to the order in the sequence.

Or, in an embodiment, the pixel data PXi is such as a distribution state of red pixel values, green pixel values, blue pixel values and alpha values. The distribution state is such as the ratio of X consecutive identical pixel values.

Next, in step S820, the key information category CGi and the key information item ITi that the key information interface UI needs to display when each application APi operates is obtained by the data analysis unit 720 according to the applications APi. For different applications APi, the key information category CGi and the key information item ITi that need to be displayed are not necessarily identical. During the training of the key information inference model MD, the key information category CGi and the key information item ITi that need to be displayed can be set according to the characteristics of respective applications APi.

Then, in step S830, the key information inference model MD is trained by the artificial intelligence operation unit 730 according to the corresponding pixel data PXi, key information category CGi and key information item ITi. The key information inference model MD can be trained according to the distribution state of the red pixel values, green pixel values, blue pixel values and alpha values of the pixel data PXi. The artificial intelligence operation unit 730 can perform training using a supervised learning algorithm, an unsupervised learning algorithm or a reinforcement learning algorithm.

In an embodiment where the supervised learning algorithm is employed, training and forecasting can be performed according to a set of labeled data. For instance, in step S820, the key information category CGi and the key information item ITi can be used as labels for the purpose of training and forecasting.

In an embodiment where the unsupervised learning algorithm is employed, the data point is not labeled, but the unsupervised learning algorithm will add label by way of organizing data or describing the structure of data, therefore step S820 can be omitted.

In an embodiment where the reinforcement learning algorithm is employed, the model can learn from the obtained result and decide the next action. After each action is completed, the reinforcement learning algorithm will receive a response with which the model can determine whether the decision is correct, neutral or incorrect, then optimize the model according to the determination. In the optimization mode M3 of the present embodiment, the key information inference model MD can be optimized using the reinforcement learning algorithm. The optimization mode M3 is described after the inference mode M2.

The above training of the key information inference model MD is executed by the electronic device 700 for the purpose of exemplification. In another embodiment, the training of the key information inference model MD can be completed using another independent server, and the trained key information inference model MD is disposed in a server rather than the electronic device 700.

After the key information inference model MD is training through steps S810 to S830, the model can proceed to the inference mode M2.

Figure 9:
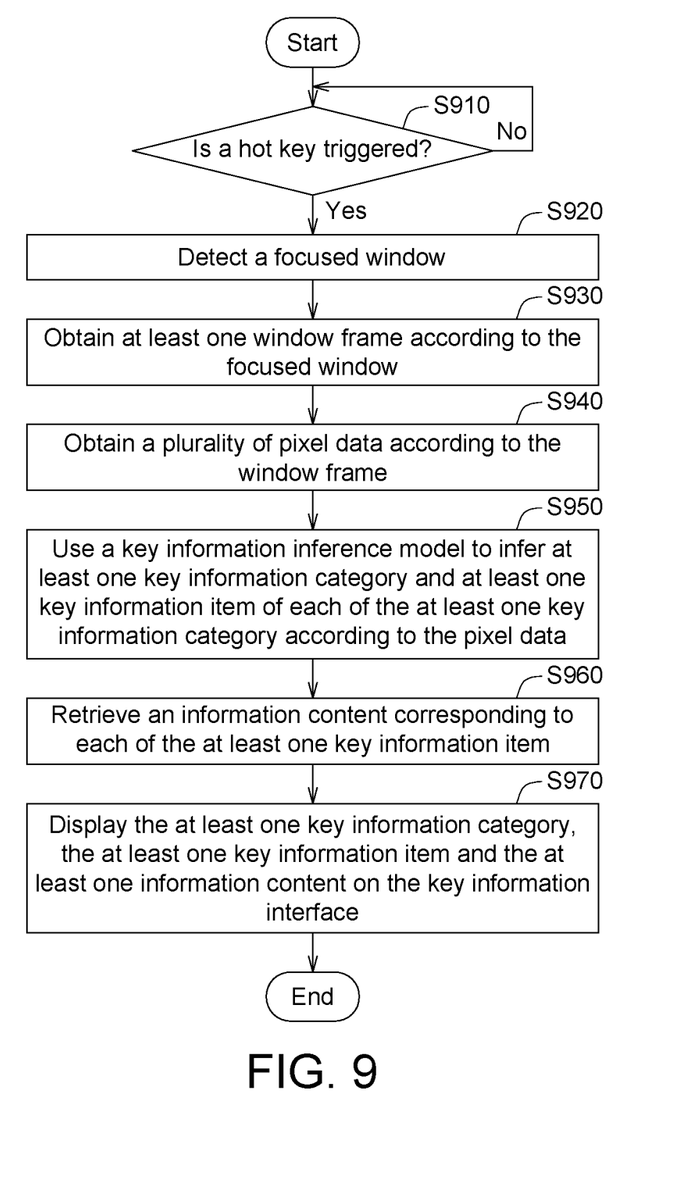
FIG. 9 is a flowchart of a displaying method for a key information interface according to an embodiment.

Referring to FIG. 7 and FIG. 9. FIG. 9 is a flowchart of a displaying method for a key information interface UI according to an embodiment. In step S910, whether a hot key KY is triggered is determined by the application layer operation unit 710. The hot key KY is such as a physical key, a combination of a plurality of physical keys, a touch key of a touch panel or a virtual key displayed in the air. If the hot key KY is triggered, the method proceeds to step S920.

In step S920, a focused window WDj of the user is detected by the application layer operation unit 710. When the user operates the electronic device 700, the user may open several applications. The application layer operation unit 710 detects the focused window WDj according to the situation where the user presses the hot key KY. For instance, the application layer operation unit 710 can use the topmost window as the focused window WDj. Or, the application layer operation unit 710 can use the window with the largest range as the focused window WDj. Or, the application layer operation unit 710 can use the window where a cursor appears as the focused window WDj.

Then, in step S930, at least one window frame FMj is obtained by the data analysis unit 720 according to the focused window WDj. The data analysis unit 720 can obtain a single window frame FMj at the moment when the user presses the hot key KY. Or, the data analysis unit 720 can obtain several consecutive window frames FMj at the moment when the user presses the hot key KY to avoid the inference being misled by the insertion of an unexpected advertisement or a specific frame of the film.

Then, in step S940, a plurality of pixel data PXj are obtained by the data analysis unit 720 according to the window frame FMj. Exemplarily, the pixel data PXj includes a red pixel value, a green pixel value, a blue pixel value and an alpha value. In the present step, the pixel data PXj can be recorded according to the order in the sequence.

Or, in an embodiment, the pixel data PXj is such as a distribution state of red pixel values, green pixel values, blue pixel values and alpha values. The distribution state is such as the ratio of X consecutive identical pixel values.

Then, in step S950, at least one key information category CGj and at least one key information item ITj are inferred according to the pixel data PXj by the artificial intelligence operation unit 730 using the key information inference model MD. The key information inference model MD perform inference according to the distribution state of the red pixel values, green pixel values, blue pixel values and alpha values of the pixel data PXj.

Then, in step S960, an information content CTj corresponding to each key information item ITj is retrieved by the hardware layer monitoring unit 740.

Then, in step S970, the key information category CGj, the key information item ITj and the information content CTj are displayed on the key information interface UI by the application layer operation unit 710.

The inference of the key information inference model MD is executed the electronic device 700 for the purpose of exemplification. In another embodiment, the key information inference model MD can be disposed in a server rather than the electronic device 700. When the electronic device 700 needs to infer the key information interface UI, the pixel data PXj can be uploaded to a server via the Internet for the key information inference model MD inside the server to infer the key information category CGj and the key information item ITj. After the key information category CGj and the key information item ITj are transmitted back to the electronic device 700, the electronic device 700 can use the hardware layer monitoring unit 740 to retrieve the information content CTj corresponding to each key information item ITj then display the key information category CGj, the key information item ITj and information content CTj on the key information interface UI.

The inference of the content of the key information interface UI can be completed through steps S910 to S970. The user can quickly look up the required key information from the key information interface UI. When the user executes different applications, the key information interface UI can adaptively display the required key information category CGj, the key information item ITj and the information content CTj.

In the present embodiment, inference is directly performed according to the pixel data PXj; even under circumstances where new electronic devices and applications are provided one after another and file names are updated, the key information category CGj, the key information item ITj and the information content CTj that the key information interface UI needs to display still can be adaptively inferred.

Under some circumstances, the user can make corrections to the key information interface UI. For instance, the user can remove a particular key information categories CGj or a particular key information items ITj. Meanwhile, the method proceeds to the optimization mode M3.

Figure 10:
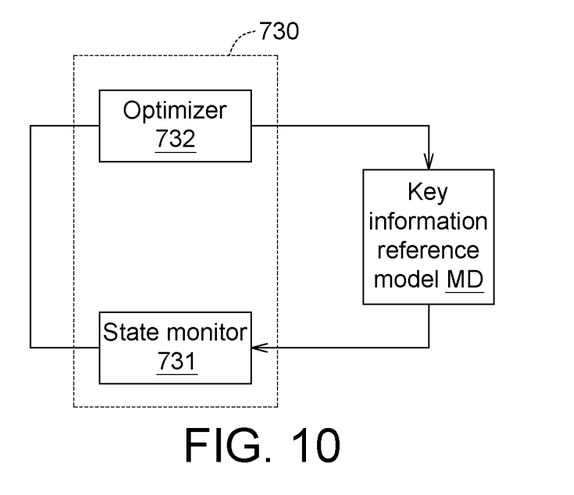
FIG. 10 is schematic diagram of an artificial intelligence operation unit according to an embodiment.
Figure 11:
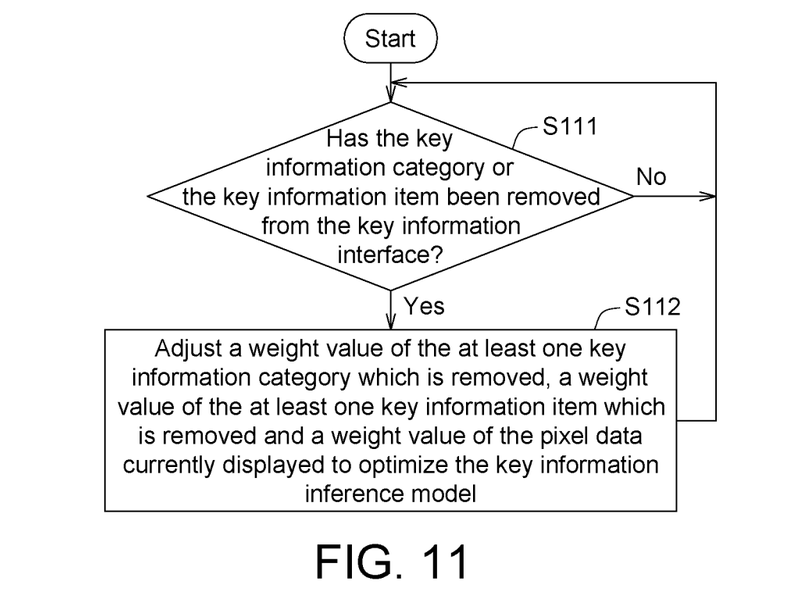
FIG. 11 is a flowchart of an optimization method for a key information inference model according to an embodiment.

Refer to FIG. 10 and FIG. 11. FIG. 10 is schematic diagram of an artificial intelligence operation unit 730 according to an embodiment. FIG. 11 is a flowchart of an optimization method for a key information inference model MD according to an embodiment. The artificial intelligence operation unit 730 includes a state monitor 731 and an optimizer 732. The state monitor 731 is used to detect and monitor the inference result of the key information inference model MD. The optimizer 732 is used to optimize the key information inference model MD.

In step S111, the state monitor 731 is used to detect the key information category CGj displayed on the key information interface UI or determine whether the key information item ITj is removed. If the key information category CGj or the key information item ITj displayed on the key information interface UI is removed, the method proceeds to step S112.

In step S112, the weight value of the removed key information category CGj, the weight value of the removed key information item ITj and the weight value of the current pixel data PXj are adjusted by the optimizer 732 to optimize the key information inference model MD. For instance, the optimizer 732 can reduce the weight value of the key information category CGj at a first degree, reduce the weight value of the key information item ITj at a second degree, and reduce the weight value of the pixel data PXj at a third degree. The second degree is greater than the first degree; the first degree is greater than the third degree. After the weight value of an item is reduced, the probability of this item being inferred is reduced. In the present embodiment, since the weight value of the key information item ITj is reduced most, the probability of the key information item ITj being inferred is greatly reduced.

After the artificial intelligence operation unit 730 performs optimization on the key information inference model MD of the electronic device 700 operated by the user, the key information inference model MD can be stored in the electronic device 700. Thus, next time when the user performs inference using the optimized key information inference model MD, an inference result that better matches the user's needs can be obtained.

The optimization of the key information inference model MD is executed the electronic device 700 for the purpose of exemplification. In another embodiment, the key information inference model MD can be disposed in a server rather than the electronic device 700. When the electronic device 700 needs to optimize the key information interface UI, the removed key information category CGj or key information item ITj can be uploaded to a server through the Internet for the server to optimize the key information inference model MD.

According to the above embodiments, various electronic devices 700 and applications APi can correspondingly establish a key information inference model MD. After the user presses a hot key KY, the key information category CGj and the key information item ITj that the key information interface UI needs to display can be directly inferred according to the pixel data PXj of the window frame WDj, and corresponding information content CTj can be retrieved. Despite new electronic devices, games, streaming media applications or utility programs are provided one after another, the key information that the key information interface UI needs to display can be inferred according to the pixel data PXj by using the artificial intelligence technology of the present embodiment.

Besides, the key information inference model MD can adaptively perform optimization on the key information inference model MD according to the user's habits, so that when the user performs inference using the optimized key information inference model MD, an inference result that better matches the user's needs can be obtained.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A displaying method for a key information interface, comprising:
   determining a hot key is triggered;
   detecting a focused window when the hot key is triggered;
   obtaining at least one window frame according to the focused window;
   obtaining a plurality of pixel data according to the at least one window frame;
   using a key information inference model to infer at least one key information category and at least one key information item of each of the at least one key information category according to the pixel data;
   retrieving an information content corresponding to each of the at least one key information item; and
   displaying the at least one key information category, the at least one key information item and the at least one information content on the key information interface.

2. The displaying method for the key information interface according to claim 1, wherein each of the plurality of pixel data comprises a red pixel value, a green pixel value, a blue pixel value and an alpha value.

3. The displaying method for the key information interface according to claim 2, wherein the key information inference model performs inference according to a distribution of the red pixel values, the green pixel values, the blue pixel values and the alpha values of the plurality of pixel data.

4. The displaying method for the key information interface according to claim 1, wherein in the step of obtaining the focused window, a topmost window is used as the focused window.

5. The displaying method for the key information interface according to claim 1, wherein in the step of obtaining the focused window, a window with a largest area is used as the focused window.

6. The displaying method for the key information interface according to claim 1, wherein in the step of obtaining the focused window, a window where a cursor appears is used as the focused window.

7. An electronic device, comprising: an application layer operation unit, configured to
detect a hot key is triggered,
wherein when the hot key is triggered, the application layer operation unit detects a focused window;
a data analysis unit, configured to obtain at least one window frame of the focused window and obtain a plurality of pixel data according to the at least one window frame;
an artificial intelligence operation unit, configured to use a key information inference model to infer at least one key information category and at least one key information item of each of the at least one key information category of a key information interface according to the plurality of pixel data; and
a hardware layer monitoring unit, configured to retrieve an information content corresponding to each of the at least one key information item, wherein the application layer operation unit is further used to display the at least one key information category, the at least one key information item and the information content on the key information interface.

8. The electronic device according to claim 7, wherein each of the plurality of pixel data comprises a red pixel value, a green pixel value and a blue pixel value and an alpha value.

9. The electronic device according to claim 8, wherein the key information inference model performs inference according to a distribution of the red pixel values, the green pixel values, the blue pixel values and the alpha values of the plurality of pixel data.

10. The electronic device according to claim 7, wherein the application layer operation unit uses a topmost window as the focused window.

11. The electronic device according to claim 7, wherein the application layer operation unit uses a window with a largest range as the focused window.

12. The electronic device according to claim 7, wherein the application layer operation unit uses a window where a cursor appears as the focused window.

13. The electronic device according to claim 7, wherein the artificial intelligence operation unit comprises:
a state monitor, configured to detect whether the at least one key information category or the at least one key information item has been removed from the key information interface; and
an optimizer, configured to adjust a weight value of the at least one key information category being removed, a weight value of the at least one key information item being removed and a weight value of the plurality of pixel data currently displayed to optimize the key information inference model if the at least one key information category or the at least one key information item has been removed from the key information interface.

14. The electronic device according to claim 13, wherein the optimizer reduces the weight value of the at least one key information category at a first degree, reduces the weight value of the at least one key information item at a second degree, and reduces the weight value of the pixel data at a third degree; the second degree is greater than the first degree.

15. The electronic device according to claim 14, wherein the first degree is greater than the third degree.

* * * * *